US010024448B2

(12) United States Patent
Watanabe (10) Patent No.: US 10,024,448 B2
(45) Date of Patent: Jul. 17, 2018

(54) FLAT SPRING FOR SOLENOID VALVE AND SOLENOID VALVE USING THE SAME (71) Applicant: Koganei Corporation, Koganei-shi, Tokyo (JP)

(72) Inventor: Akira Watanabe, Koganei (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 15/504,519

(22) PCT Filed: Apr. 14, 2015

(86) PCT No.: PCT/JP2015/061483
§ 371 (c)(1),
(2) Date: Feb. 16, 2017

(87) PCT Pub. No.: WO2016/027506
PCT Pub. Date: Feb. 25, 2016

(65) Prior Publication Data
US 2017/0234445 A1 Aug. 17, 2017

(30) Foreign Application Priority Data

Aug. 20, 2014 (JP) .................................. 2014-167724

(51) Int. Cl.
*F16K 31/06* (2006.01)
*F16F 1/02* (2006.01)
(Continued)

(52) U.S. Cl.
CPC ............ *F16K 27/029* (2013.01); *F16F 1/025* (2013.01); *F16F 1/027* (2013.01); *F16F 1/185* (2013.01);
(Continued)

(58) Field of Classification Search
CPC ..... F16K 1/00; F16K 1/36; F16K 1/44; F16K 11/00; F16K 11/02; F16K 11/04;
(Continued)

(56) References Cited

U.S. PATENT DOCUMENTS

2010/0038572 A1    2/2010   Alvarez et al.

FOREIGN PATENT DOCUMENTS

JP    02240474 A    9/1990
JP    02292584 A    12/1990
(Continued)

OTHER PUBLICATIONS

International Search Report for PCT Serial No. PCT/JP2015/061483 dated Jul. 21, 2015.

*Primary Examiner* — Reinaldo Sanchez-Medina
*Assistant Examiner* — Hailey K Do
(74) *Attorney, Agent, or Firm* — McCormick, Paulding & Huber LLP (57) ABSTRACT

A flat spring (70) of a solenoid valve has: an engaging claw (75) which is engaged with an engaging protrusion provided on a movable iron core, and a supporting portion (71) which is installed and fixed between a valve housing and a bobbin. The supporting portion (71) is provided with an attaching claw (72); the attaching claw (72) is attached to an attaching claw holder provided on the bobbin. The engaging claw (75) is provided on a leading end of a pulling portion (73), and a connected portion (74) connects a base end of the pulling portion (73) with the supporting portion (71).

3 Claims, 11 Drawing Sheets (51) Int. Cl.
*F16F 1/18* (2006.01)
*F16F 15/14* (2006.01)
*F16K 27/02* (2006.01)
*H01F 7/16* (2006.01)
*H01F 27/24* (2006.01)

(52) U.S. Cl.
CPC .......... *F16F 1/187* (2013.01); *F16F 15/1471* (2013.01); *F16K 31/06* (2013.01); *F16K 31/0675* (2013.01); *F16K 31/0682* (2013.01); *H01F 7/16* (2013.01); *H01F 27/24* (2013.01)

(58) Field of Classification Search
CPC ...... F16K 11/044; F16K 11/048; F16K 11/06; F16K 11/065; F16K 11/0655; F16K 27/02; F16K 27/0263; F16K 27/029; F16K 31/00; F16K 31/02; F16K 31/06; F16K 31/0603; F16K 31/061; F16K 31/0624; F16K 31/0627; F16K 31/0634; F16K 31/0644; F16K 31/0655; F16K 31/0682; F16K 31/082; F16K 31/086; F16K 31/10; Y10T 137/86574; Y10T 137/8667; Y10T 137/86686; Y10T 137/86815; Y10T 137/86831; Y10T 137/86879; Y10T 137/87169; Y10T 137/87233; Y10T 137/87241; Y10T 137/87571; Y10T 137/87676; Y10T 137/87684; Y10T 137/87692; F16F 1/025; F16F 1/027; F16F 1/18; F16F 1/185; F16F 1/187; F16F 1/26; F16F 15/1471

See application file for complete search history.

(56) References Cited

FOREIGN PATENT DOCUMENTS

| | | |
|---|---|---|
| JP | 08321419 A | 12/1996 |
| JP | 08330130 A | 12/1996 |
| JP | 2002276724 A | 9/2002 |
| JP | 2006082619 A | 3/2006 |
| JP | 2010504478 A | 2/2010 |

FLAT SPRING FOR SOLENOID VALVE AND SOLENOID VALVE USING THE SAME

CROSS REFERENCE TO RELATED APPLICATIONS

This application is a National Stage application of International Patent Application No. PCT/JP2015/061483, filed on Apr. 14, 2015, which claims priority to Japanese Patent Application No. 2014-167724, filed on Aug. 20, 2014, each of which is hereby incorporated by reference in its entirety.

TECHNICAL FIELD

The present invention relates to a flat spring provided on a movable iron core which drives a valve element of a solenoid valve, and also relates to a solenoid valve using such a flat spring.

BACKGROUND ART

To control supplying of compressed air to a pneumatic equipment or the like, or to control compressed air exhaust from the pneumatic equipment, or further to control a process to switch communication passages, a solenoid valve which uses a poppet valve to open and close communication holes provided in a valve seat has been utilized.

In a two-port solenoid valve having an air-supply port communicating with a compressed air-supply source and an output port communicating with an equipment to be supplied with compressed air, a poppet valve controls switching between a communicating state and a blocked state of the ports. On the other hand, in a three-port solenoid valve having an exhaust port in addition to the air-supply port and the output port, the poppet valve controls switching between two states. In one state, the poppet valve operates to block communication between the exhaust port and the output port while enabling communication between the air-supply port and the output port, thereby supplying compressed air to the pneumatic equipment through the output port. In the other state, the poppet valve operates to block communication between the air-supply port and the output port while enabling communication between the exhaust port and the output port, thereby discharging the compressed air, which returned to the output port from the pneumatic equipment, to the outside through the exhaust port.

A solenoid which opens and closes the poppet valve has a fixed iron core with a magnetic wire wound around, and a movable iron core to be driven by the magnetic wire, that is, an energized coil; thus, a poppet valve is driven by the movable iron core. The movable iron core is a swingable type which is swingable about one end portion of the movable iron core; this swingable movable iron core is also referred to as a "flapper" or an "armature". Patent Documents 1 to 3 describe such solenoid valves each having a swingable movable iron core.

RELATED ART DOCUMENTS

Patent Documents

Patent Document 1: Japanese Unexamined Patent Application Publication No. H08-321419
Patent Document 2: Japanese Unexamined Patent Application Publication No. H08-330130
Patent Document 3: Japanese Translation of PCT International Application Publication No. JP-T-2010-504478

SUMMARY

The solenoid valves described in Patent Documents 1 to 3 are each provided with a U-shaped fixed iron core having two leg portions, and at least one of the leg portions has a coil wound around. As described in Patent Documents 1 and 2, the solenoid valve is provided with a compression spring. A spring force of the compression spring is applied to a flapper. By this spring force, a magnetically-attracted surface on the flapper is separated from a magnetically-attracting surface on the fixed iron core. The solenoid valve described in Patent Document 3 is also provided with a compression spring. A spring force of this compression spring is applied to an armature. By this spring force, a magnetically-attracted surface of the armature serving as a movable iron core is separated from a magnetically-attracting surface of a fixed iron core.

As described above, in the solenoid valve which utilizes the compression spring to have a spring force applied to the flapper or armature, a space for storing the compression spring needs to be provided inside a valve housing; thus, the solenoid valve has difficulties on reducing its size. Additionally, when the compression spring is designed to be assembled inside the valve housing, the solenoid valve cannot be easily assembled.

An object of the present invention is to provide a solenoid valve reduced in size. A further object of the present invention is to enhance the assembly workability of the solenoid valve.

A flat spring for a solenoid valve according to one aspect of the present invention applies a spring force to a movable iron core of the solenoid valve in a direction to separate a magnetically-attracted surface of the movable iron core from a magnetically-attracting surface of a fixed iron core, the flat spring comprising: an engaging claw which is engaged with an engaging protrusion provided on the movable iron core; and a supporting portion which is integrally provided with the engaging claw and is installed and fixed between a valve housing and a bobbin of the solenoid valve.

A solenoid valve according to another aspect of the present invention comprises: a valve housing having a valve element which is operated between: a closed position in which the valve element abuts on a valve seat to close communication holes; and an open position in which the valve element separates from the valve seat to open the communication holes; a fixed iron core provided in the valve housing; a magnetically-attracting surface provided on the fixed iron core; a movable iron core provided in the valve housing, a magnetically-attracted surface being provided on the movable iron core and being attracted onto the magnetically-attracting surface of the fixed iron core; and the above-mentioned flat spring for the solenoid valve, in which a spring force of the flat spring is applied to the movable iron core of the solenoid valve in a direction to separate the magnetically-attracted surface from the magnetically-attracting surface.

The flat spring for a solenoid valve has an engaging claw which engages with an engaging protrusion of a movable iron core, and a supporting portion which is inserted between the valve housing and the bobbin; a spring force of this flat spring is applied to the movable iron core in a direction to separate the magnetically-attracted surface of the movable iron core from the magnetically-attracting surface of the fixed iron core. Since the flat spring can be disposed in a direction along the movable iron core, the flat spring can be assembled into a small space between the valve housing and the bobbin. Therefore, the solenoid valve can be reduced in size. Moreover, since the flat spring can be assembled into the valve housing with the movable iron core attached to the flat spring, the solenoid valve can easily be assembled, thereby enhancing the assembly workability for the solenoid valve.

DETAILED DESCRIPTION

Figure 1:
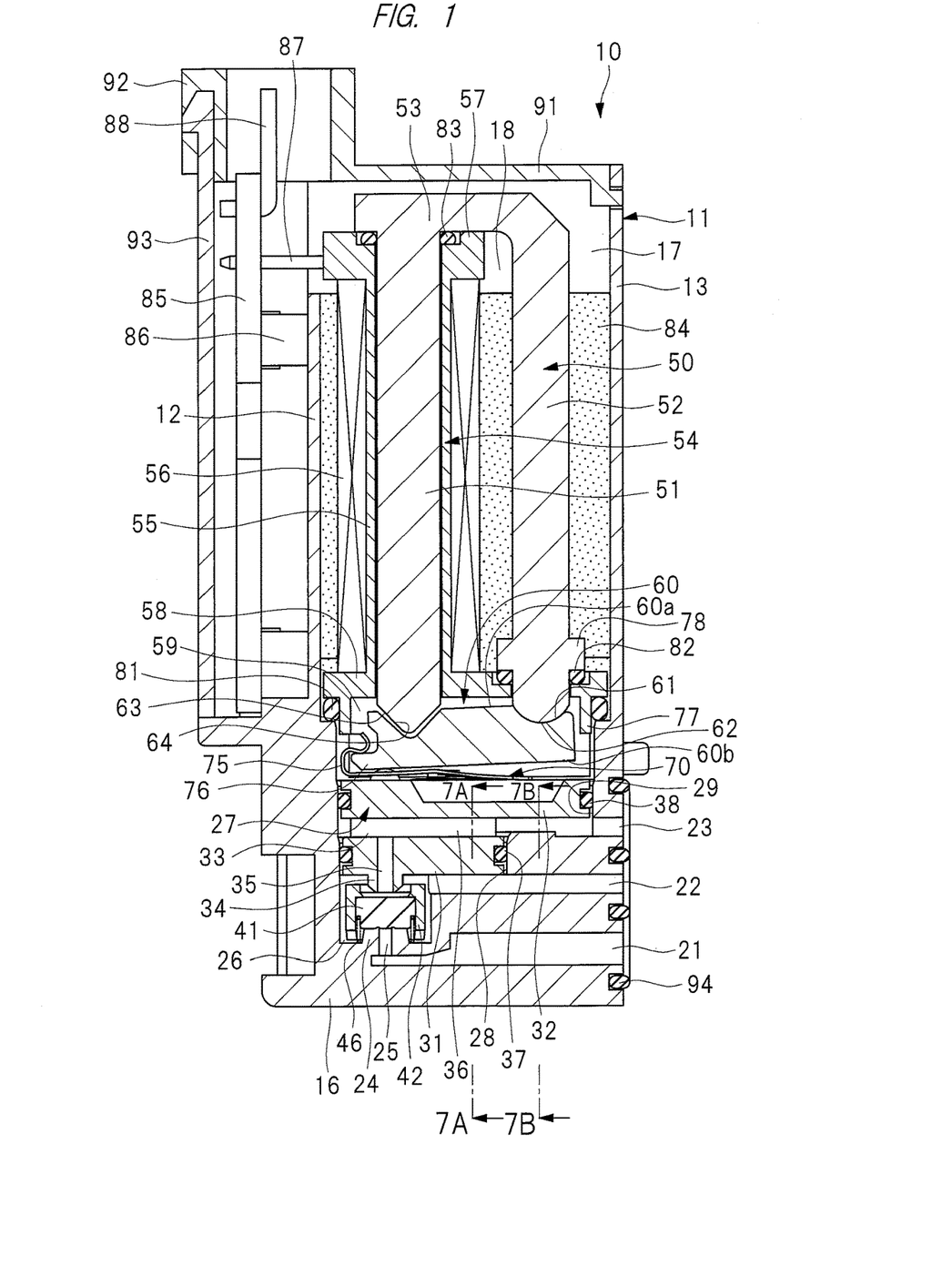
FIG. 1 is a cross-sectional view showing a solenoid valve according to an embodiment of the present invention with the coil de-energized.
Figure 2:
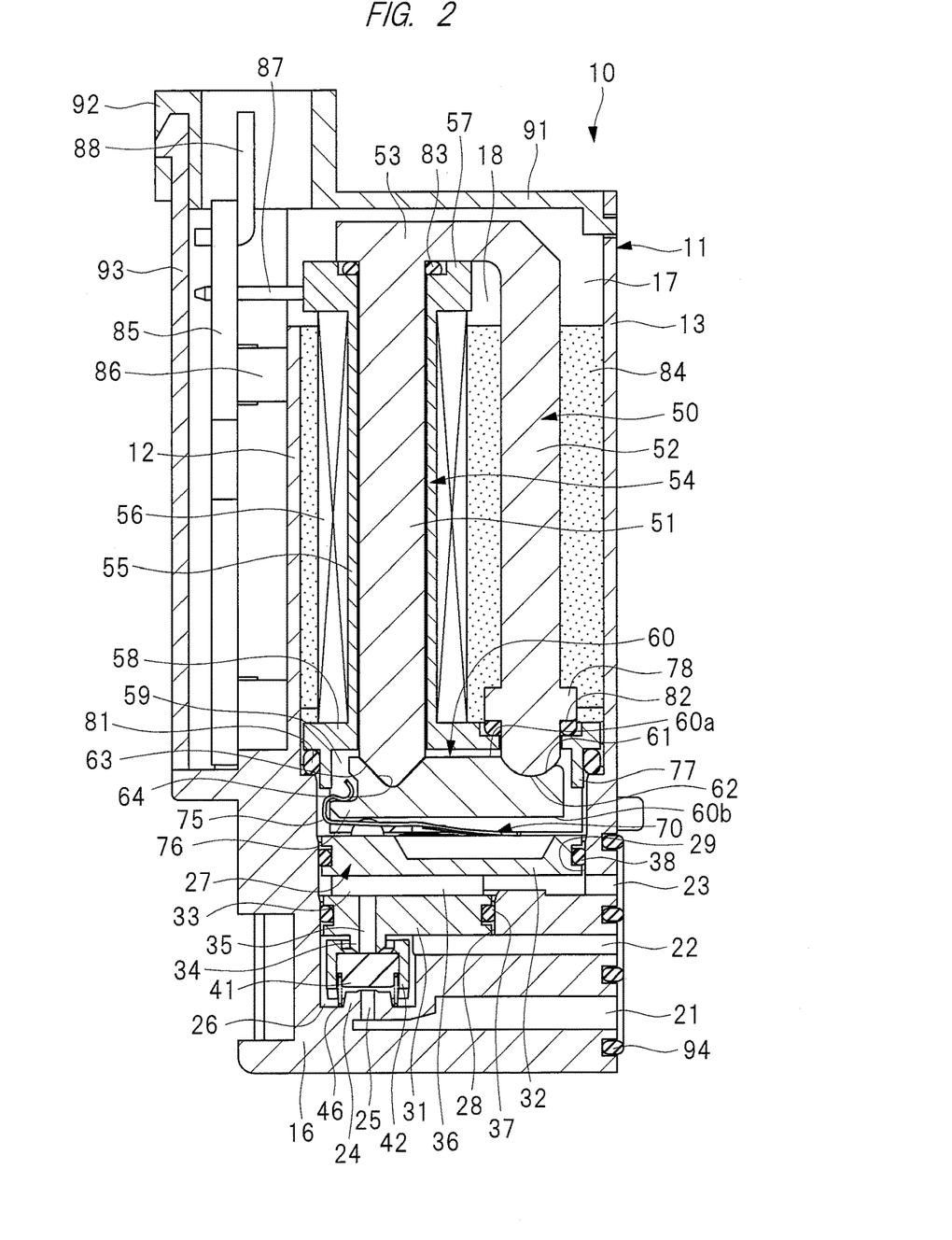
FIG. 2 is a cross-sectional view showing the solenoid valve of FIG. 1 with the coil energized.
Figure 3:
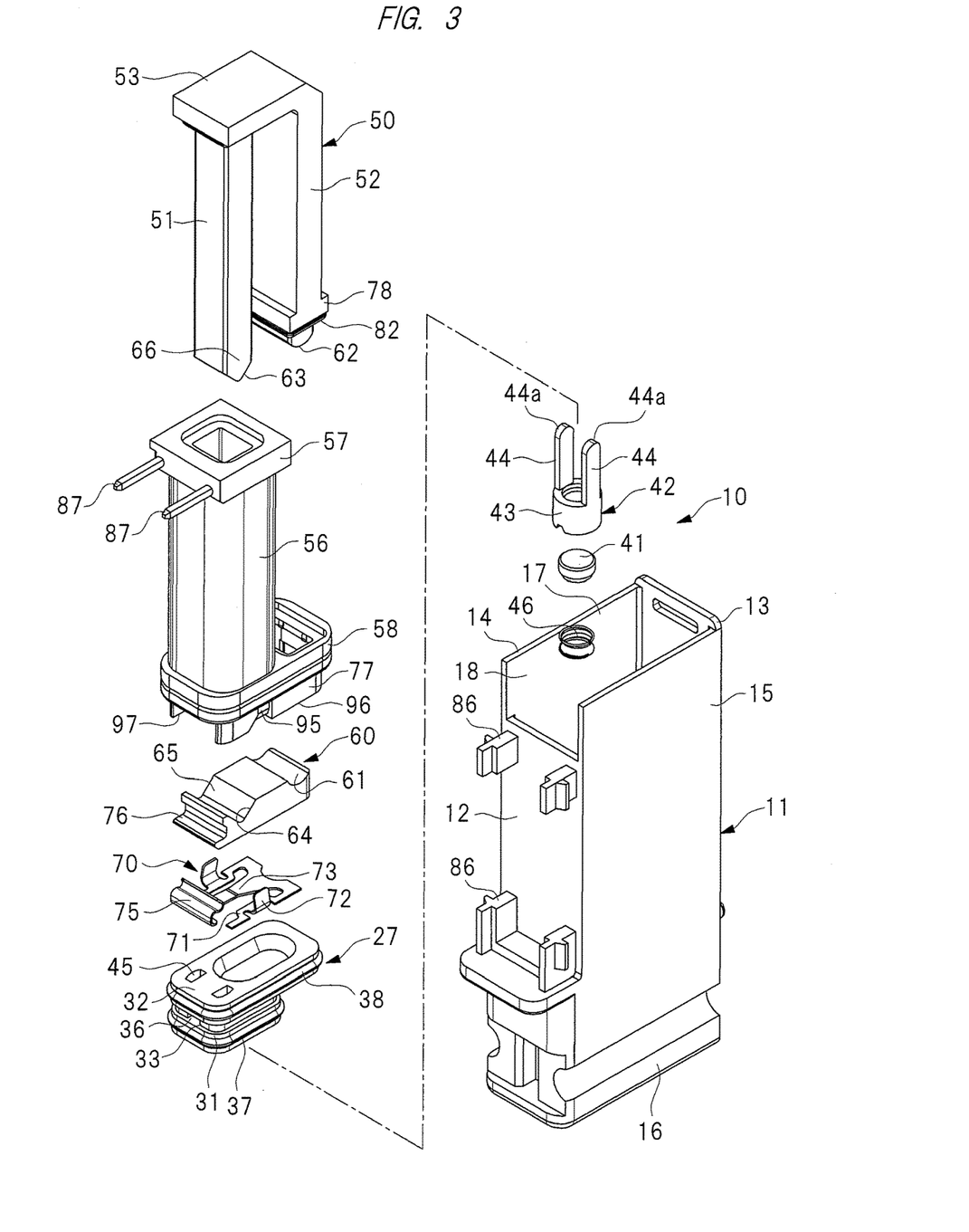
FIG. 3 is an exploded perspective view showing the solenoid valve of FIGS. 1 and 2.

Hereinafter, an embodiment of the present invention will be described in detail on the basis of the drawings. As shown in FIGS. 1 to 3, a solenoid valve 10 has a valve housing 11 made of resin. As shown in FIG. 3, the valve housing 11 has a front wall 12, a rear wall 13 and side walls 14 and 15, and is substantially rectangular in shape. As shown in FIGS. 1 and 2, one end portion of the valve housing 11 in a longitudinal direction is provided with a flow passage portion 16, and the other end portion is indicated as an opening end 17. In this manner, the valve housing 11 has four walls which form a quadrilateral shape in a cross-sectional view of the valve housing 11, and a bottom portion of the valve housing 11 is closed by the flow passage portion 16. A housing space 18 is provided in the valve housing 11, and parts constituting the solenoid valve 10 are stored in the housing space 18.

The flow passage portion 16 is provided with a first port 21, a second port 22 and a third port 23; thus, the solenoid valve 10 is a three-port solenoid valve. The ports 21 to 23 extend through the valve housing 11 in a front to rear direction, and are adjacently opened on a same side as the rear wall 13 of the valve housing 11. The second port 22 is positioned closer to the opening end 17 than the first port 21, and the third port 23 is positioned closer to the opening end 17 than the second port 22.

The flow passage portion 16 is provided with a first valve seat 24 on the front wall 12. The first valve seat 24 is provided with a first communication hole 25 which communicates with the first port 21, the first communication hole 25 extending in the longitudinal direction of the valve housing 11. The flow passage portion 16 of the valve housing 11 is provided with a valve element housing hole 26; the first communication hole 25 extends to a bottom portion of the valve element housing hole 26, and the second port 22 extends to an inner circumferential surface of the valve element housing hole 26. Thus, the first port 21 is communicated with the second port 22 through the first communication hole 25 and the valve element housing hole 26.

Figure 7A:
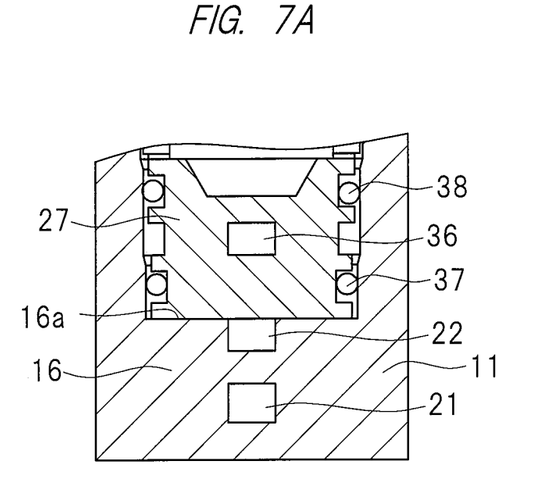
FIG. 7A is an enlarged cross-sectional view taken along a line 7A-7A of FIG. 1.
Figure 7B:
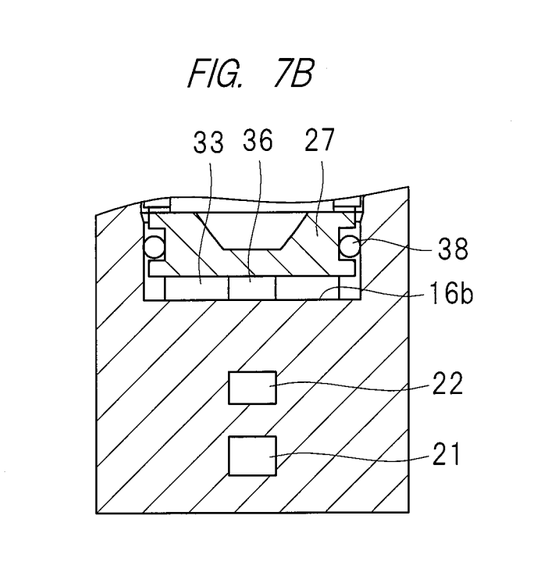
FIG. 7B is an enlarged cross-sectional view taken along a line 7B-7B of FIG. 1.

A flow passage block 27 is inserted into the valve housing 11 from the opening end 17 of the valve housing 11. As shown in FIG. 7, the flow passage block 27 is assembled into the valve housing 11 so that a bottom surface of the flow passage block 27 abuts on an abutting surface 16a provided on the flow passage portion 16. The flow passage block 27 partially constitutes the valve housing 11. The flow passage block 27 partitions the valve element housing hole 26 into a space on a same side as the opening end 17 and a space in the bottom portion of the valve element housing hole 26. The flow passage block 27 abuts on the abutting surface 16a; thus, the flow passage block 27 is correctly positioned.

The flow passage portion 16 is provided with a fitting hole 28 between the second port 22 and the third port 23. Additionally, the flow passage portion 16 is provided with a fitting hole 29 which is positioned closer to the opening end 17 than the third port 23. Each fitting hole 28 and 29 has an inner circumferential surface which is substantially quadrilateral in shape. The flow passage block 27 has: a first flow passage forming portion 31 which is fitted into the fitting hole 28; a second flow passage forming portion 32 which is fitted into the fitting hole 29; and a spacer 33 which is provided between the flow passage forming portions 31 and 32. The two flow passage forming portions 31 and 32 and the spacer 33 are integrally molded and are made of resin.

A second valve seat 34 is provided on the first flow passage forming portion 31 so as to face the first valve seat 24. The second valve seat 34 is provided with a second communication hole 35 which is coaxial with the first communication hole 25, and the second communication hole 35 extends to the valve element housing hole 26. The spacer 33 of the flow passage block 27 is provided with a communication passage 36 through which the second communication hole 35 and the third port 23 communicate with each other. Thus, the second port 22 is communicated with the third port 23 through the valve element housing hole 26, the second communication hole 35 and the communication passage 36. A sealing member 37 seals a gap between the first flow passage forming portion 31 of the flow passage block 27 and the valve housing 11. A sealing member 38 seals a gap between the second flow passage forming portion 32 and the valve housing 11.

Figure 5:
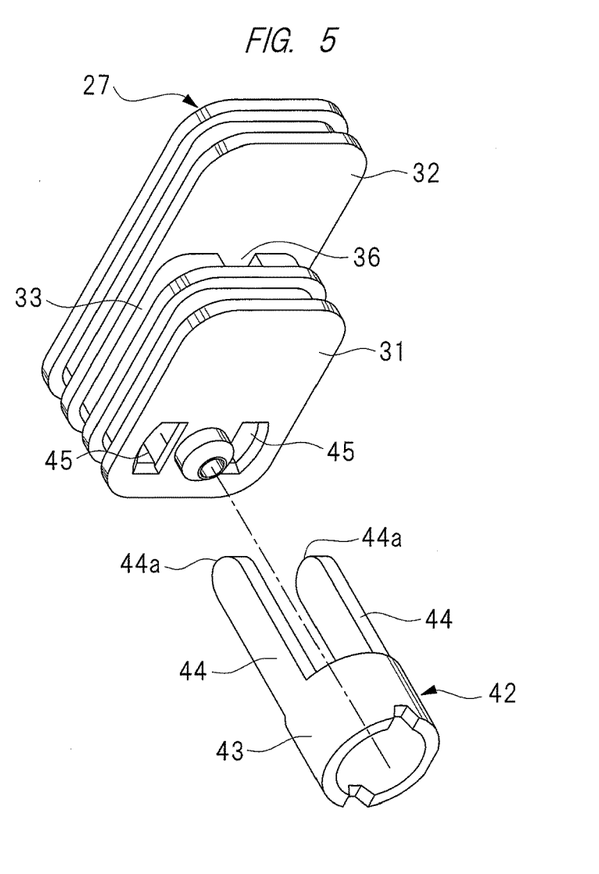
FIG. 5 is an enlarged perspective view showing a valve driving member of FIG. 3.
Figure 8:
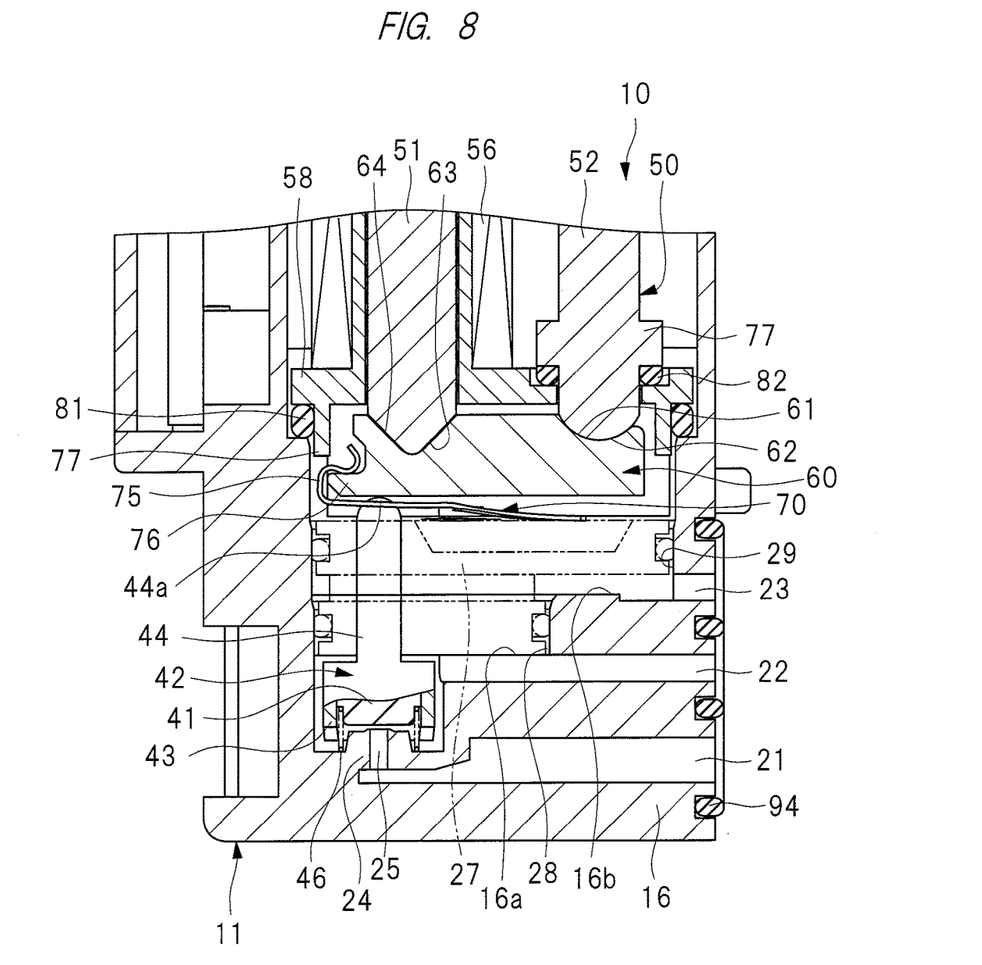
FIG. 8 is an enlarged cross-sectional view showing one portion of FIG. 2 with a flow passage block omitted.

A poppet valve 41, which is a valve element made of rubber, is stored in the valve element housing hole 26. A valve driving member 42 is made of metal or resin and has a cylindrical portion 43; the poppet valve 41 is inserted and attached to the cylindrical portion 43 from its bottom side. As shown in FIGS. 3 and 5, the valve driving member 42 has two driving portions 44 which are integrated with the cylindrical portion 43. The driving portions 44 are inserted into two through holes 45 provided on the flow passage block 27, and are axially movable. An arcuate surface is formed on each tip portion 44*a* of the driving portions 44, and as shown in FIG. 8, the tip portions 44*a* protrude from the flow passage block 27 toward the opening end 17 of the valve housing 11.

The valve element housing hole 26, in which the poppet valve 41 and the cylindrical portion 43 are stored, extends toward the opening end 17 of the valve housing 11 through the fitting holes 28 and 29. Thus, the driving portions 44 are inserted into the through holes 45 prior to the valve driving member 42 and the flow passage block 27 being inserted into the valve housing 11 from the same side as the opening end 17. In this manner, the valve driving member 42 and the flow passage block 27 are assembled into the flow passage portion 16, and the poppet valve 41 is disposed in the valve element housing hole 26.

The poppet valve 41 has two end surfaces which abut on the valve seats 24 and 34. As shown in FIG. 1, when the poppet valve 41 separates from the second valve seat 34 to abut on the first valve seat 24, the poppet valve 41 closes the first communication hole 25 and is set to a closed position to block communication between the first port 21 and the second port 22, while further being set to an open position to allow the second port 22 and the third port 23 to communicate with each other. On the other hand, as shown in FIG. 2, when the poppet valve 41 separates from the first valve seat 24 to abut on the second valve seat 34, the poppet valve 41 closes the second communication hole 35 and is set in an open position to allow the first port 21 and the second port 22 to communicate with each other, while being further set to a closed position to block communication between the second port 22 and the third port 23. In this manner, the poppet valve 41 is operated between a position to abut on the first valve seat 24 to close the first communication hole 25, and a position to abut on the second valve seat 34 to close the second communication hole 35. A compression spring 46, which serves as a spring member, is installed between the poppet valve 41 and the flow passage portion 16. By a spring force of this compression spring 46, the poppet valve 41 is urged in a direction toward the second valve seat 34.

Figure 6:
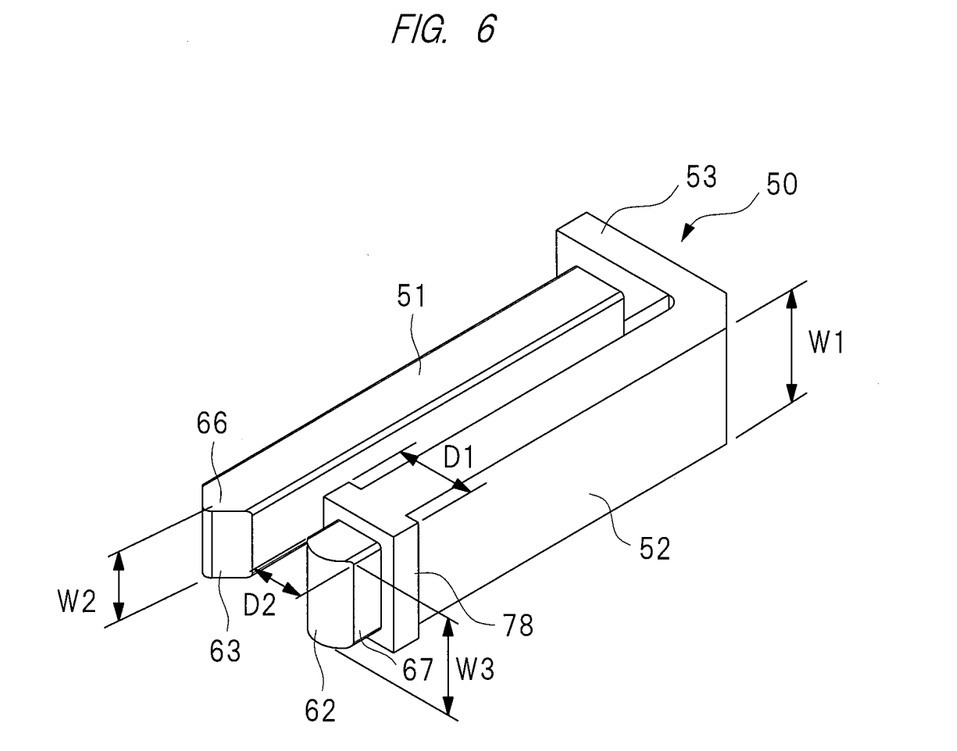
FIG. 6 is an enlarged perspective view showing a fixed iron core of FIG. 3.

A fixed iron core 50 made of magnetic material is provided in the valve housing 11. As shown in FIGS. 3 and 6, the fixed iron core 50 has a driving leg 51 and a supporting leg 52 which extend in parallel with each other, and the fixed iron core 50 is provided in the valve housing 11 with the driving leg 51 and the supporting leg 52 extending along a longitudinal direction of the valve housing 11. Base end portions of the driving leg 51 and the supporting leg 52 are integrally joined by a yoke portion 53; thus, the fixed iron core 50 has a U-shape. In this manner, the driving leg 51, the supporting leg 52 and the yoke portion 53 integrally constitutes the fixed iron core 50. Therefore, in comparison to a fixed iron core composed of two parts, the number of parts of the fixed iron core 50 can be reduced to one, thereby reducing the number of parts of the solenoid valve 10; hence, the solenoid valve 10 can be reduced in size and assembly workability can be enhanced. The driving leg 51, the supporting leg 52 and the yoke portion 53 each have a quadrilateral shape in a cross-sectional view. As shown in FIG. 6, a width dimension W1 of the supporting leg 52 is larger than a width dimension W2 of the driving leg 51, and a width dimension of the yoke portion 53 is substantially equal to the width dimension of the supporting leg 52.

In addition, a sealing flange 78 having a depth dimension larger than a depth dimension of the supporting leg 52 is provided on a leading end portion of the supporting leg 52. Furthermore, an abutting protrusion 67 is provided closer to the leading end portion of the supporting leg 52 than the sealing flange 78. In other words, the abutting protrusion 67 is formed on the supporting leg 52 and is positioned closer to the leading end portion than the sealing flange 78. As shown in FIG. 6, the width dimension W1 of the supporting leg 52 is equal to the width dimension of the yoke portion 53 and the sealing flange 78. In contrast, the width dimension W2 of the driving leg 51 is smaller than the width dimension W1 of the supporting leg 52. In the same manner, a width dimension W3 of the abutting protrusion 67 is smaller than the width dimension W1 of the supporting leg 52. Additionally, a depth dimension D2 of the abutting protrusion 67 is smaller than a depth dimension D1 of the sealing flange 78. Thus, a sealing surface which surrounds the abutting protrusion 67 is formed on a side of the sealing flange 78 facing the flow passage block 27. Moreover, a sealing surface which surrounds the driving leg 51 is formed on a side of the yoke portion 53 facing the flow passage block 27.

The fixed iron core 50 is attached with a bobbin 54 made of resin. The bobbin 54 has a cylindrical main body 55 through which the driving leg 51 is inserted; a magnetic wire is wound around an outside of the cylindrical main body 55 and forms a coil 56. One end of the cylindrical main body 55 is provided with an abutting flange 57 which abuts on an inner surface of the yoke portion 53, and the abutting flange 57 is integrated with the cylindrical main body 55. The other end of the cylindrical main body 55 is provided with a fixed flange 58 which is fitted into an inner surface of the valve housing 11, and the fixed flange 58 is integrated with the cylindrical main body 55. A driving protrusion 66 on a leading end portion of the driving leg 51 and the abutting protrusion 67 on the leading end portion of the supporting leg 52 protrude from the fixed flange 58 toward the flow passage block 27.

The fixed flange 58 is provided with a fitting protrusion 77 on its end surface, and a first sealing member 81 is hermetically fitted on an outside of the fitting protrusion 77. The abutting protrusion 67 which is on the leading end portion of the supporting leg 52 is provided with the sealing flange 78, and the sealing flange 78 surrounds the abutting protrusion 67. A second sealing member 82 is hermetically fitted between the sealing flange 78 and the fixed flange 58. Moreover, a sealing member 83 is hermetically fitted around the driving leg 51, between the abutting flange 57 and the yoke portion 53. The first sealing member 81 seals a gap between the fitting protrusion 77 of the fixed flange 58 and the inner surface of the valve housing 11, and the second sealing member 82 which is set in a concave groove formed on an inner surface of the fixed flange 58 seals a gap between an end surface of the sealing flange 78 and the fixed flange 58. Moreover, the sealing member 83 which is set in a groove formed on an inner surface of the abutting flange 57 seals a sealing surface formed between the yoke portion 53 and the abutting flange 57.

When the second sealing member 82 is fitted on a sealing surface of the abutting protrusion 67, and the sealing member 83 is fitted on a sealing surface at a base end portion of the driving leg 51, the sealing members 82 and 83 are prevented from falling out of the fixed iron core 50. Thus, assembly can be easily achieved by respectively attaching the sealing members 82 and 83 to the sealing surfaces prior to inserting the fixed iron core 50 into the bobbin 54.

An iron core housing 59 is provided between the fixed flange 58 and the flow passage block 27, and a movable iron core 60 is installed in the iron core housing chamber 59. As shown in FIGS. 1 and 2, the movable iron core 60 is disposed between the leading end portion of the driving leg 51 and the leading end portion of the supporting leg 52, that is, along the leading end portions of the fixed iron core 50. An arcuate sliding-contacting surface 61, which has a curve extending along a longitudinal direction of the movable iron core 60, is provided on one end portion of the movable iron core 60. An arcuate sliding-abutting surface 62 is provided on the leading end portion of the supporting leg 52 and corresponds to the sliding-contacting surface 61. The sliding-contacting surface 61 of the movable iron core 60 abuts on the sliding-abutting surface 62 of the supporting leg 52 so that the movable iron core 60 is swingable about one end portion of the sliding-abutting surface 62. The sliding-contacting surface 61 has a concave surface, and as shown in FIG. 3, the sliding-contacting surface 61 linearly extends in a width direction of the movable iron core 60. Moreover, the sliding-abutting surface 62 has a convex surface, and as shown in FIGS. 3 and 6, the sliding-abutting surface 62 linearly extends in a width direction of the supporting leg 52. The movable iron core 60 is swingable about a center point of the arcuate convex surface of the sliding-abutting surface 62.

In this manner, one end portion of the movable iron core 60 abuts on the supporting leg 52 and corresponds to a swinging center of the swinging movements. The other end portion of the movable iron core 60 serves as a swingable end in which the movable iron core 60 swings between a position to abut on the driving leg 51 and a position to separate from the driving leg 51. The sliding-contacting surface 61 is provided on the movable iron core 60, and the sliding-contacting surface 61 abuts on the arcuate sliding-abutting surface 62 which is provided on the leading end portion of the supporting leg 52. Therefore, the movable iron core 60 is swingable without shaft members or the like fixing the movable iron core 60 onto the supporting leg 52. This structure does not require any type of shaft member, thereby reducing the number of parts of the solenoid valve 10; hence, the solenoid valve 10 can be reduced in size and can easily be assembled. Moreover, the movable iron core 60 has no need to utilize members to secure a swinging center since the swinging center of the movable iron core 60 is always maintained at the same position; thus, the opening and closing precision of the poppet valve can be maintained. In a variation in which the sliding-contacting surface 61 has a convex surface and the sliding-abutting surface 62 has a concave surface, the movable iron core 60 is swingable about a center point of the arcuate convex surface of the sliding-contacting surface 61.

A magnetically-attracting surface 63 is provided on an end surface of the driving leg 51, and a magnetically-attracted surface 64 is provided on the other end portion of the movable iron core 60. The magnetically-attracted surface 64 faces the magnetically-attracting surface 63; the magnetically-attracted surface 64 is formed into a concave groove 65 which has a V-shape in the longitudinal direction of the movable iron core 60. The magnetically-attracting surface 63 is formed by the V-shaped driving protrusion 66 which is pushed into the concave groove 65. In this manner, when the magnetically-attracting surface 63 and the magnetically-attracted surface 64 are formed into V-shapes, the respective areas are larger than that of a flat surface, and the movable iron core 60 can be prevented from becoming larger in size. When the magnetically-attracting surface 63 and the magnetically-attracted surface 64 are respectively formed into arcuate surfaces in the same manner as in the sliding-contacting surface 61 and the sliding-abutting surface 62, the respective areas are larger in the same manner.

The sliding-contacting surface 61 and the magnetically-attracted surface 64 of the movable iron core 60 are provided on a surface, that is, an iron core facing surface 60a, so as to face the fixed iron core 50; thus, the iron core facing surface 60a faces the opening end 17 of the valve housing 11.

Figure 4:
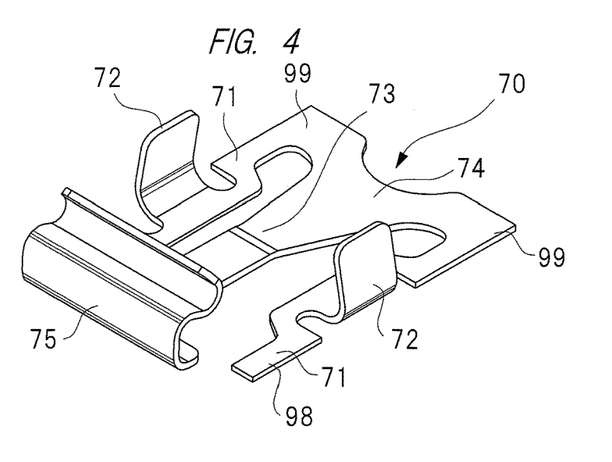
FIG. 4 is an enlarged perspective view showing a spring member of FIG. 3.

A flat spring 70, which is made of steel and serves as a spring member, is provided in the iron core housing chamber 59. The flat spring 70 is positioned between the movable iron core 60 and the flow passage block 27. As shown in FIGS. 3 and 4, the flat spring 70 has two supporting portions 71. The movable iron core 60 has the iron core facing surface 60a and a bottom surface, that is, a valve driving surface 60b, which is on an opposite side relative to the iron core facing surface 60a. The two supporting portions 71 of the flat spring 70 extend along the valve driving surface 60b. The supporting portions 71 respectively extend to side surfaces of the movable iron core 60 along the valve driving surface 60b, and an attaching claw 72 is provided on each supporting portion 71. As shown in FIG. 3, attaching claw holders 95 are provided on two separate locations at a bottom portion of the fixed flange 58 of the bobbin 54. Each attaching claw 72 of the flat spring 70 is respectively engaged with an attaching claw holder 95 on the bobbin 54. A pulling portion 73 is provided between the two supporting portions 71, and extends along the supporting portions 71; a base end portion of the pulling portion 73 and base end portions of each supporting portion 71 are integrated with a connected portion 74. The pulling portion 73 extends along the valve driving surface 60b of the movable iron core 60. An engaging protrusion 76 is provided on the swingable end of the movable iron core 60. An engaging claw 75 which is engaged with the engaging protrusion 76 of the movable iron core 60 is provided on the end portion of the pulling portion 73.

In this manner, the pulling portion 73 of the flat spring 70 for the solenoid valve extends from the connected portion 74, which faces one end portion of the movable iron core 60, to the side which faces the swingable end of the movable iron core 60. Moreover, the supporting portions 71 are provided on both sides of the pulling portion 73, and extend from the connected portion 74 toward a side facing the swingable end of the movable iron core 60.

The movable iron core 60 is attached to the flat spring 70 by the engagement between the engaging protrusion 76 and the engaging claw 75 of the flat spring 70. Moreover, the flat spring 70 to which the movable iron core 60 is attached is further attached to the bobbin 54 by the respective engagements between the attaching claws 72 of the flat spring 70 and the attaching claw holders 95 of the bobbin 54. In this manner, the movable iron core 60, the flat spring 70 and the bobbin 54 are temporarily assembled by these engagements, and the flat spring 70 is fixed by being sandwiched between the bobbin 54 and the flow passage block 27 which constitutes one portion of the valve housing 11. The pulling portion 73 has a spring force in a direction separating from the movable iron core 60, that is, in a direction toward the flow passage block 27, and the spring force is stronger than that of the supporting portions 71. Therefore, the flat spring 70 applies two forces to the movable iron core 60. One force presses the sliding-contacting surface 61 at one end portion of the movable iron core 60 onto the sliding-abutting surface 62 of the supporting leg 52, and the other force is exerted in a direction to separate the magnetically-attracted surface 64 of the other end portion of the movable iron core 60 from the magnetically-attracting surface 63 of the driving leg 51.

In this manner, the spring force of the flat spring 70 urges the poppet valve 41 in a direction toward the first valve seat 24. With the exception of the engaging claw 75 and attaching claws 72, flat portions of the flat spring 70 are disposed in a gap between the valve driving surface 60b of the movable iron core 60 and the flow passage block 27. Therefore, the space for storing the flat spring 70 can be reduced in size. The flat spring 70 is disposed to abut on the bobbin 54 and a surface of the flow passage block 27 closer to the opening end.

The tip portions 44a on the driving portions 44 of the valve driving member 42 are defined as abutting portions which abut on the movable iron core 60. That is, the flat spring 70 applies its spring force to the movable iron core 60. By this spring force, the swingable end of the movable iron core 60 presses the poppet valve 41 toward the first valve seat 24. Therefore, when the coil 56 has no driving current applied and is de-energized, as shown in FIG. 1, the magnetically-attracted surface 64 is set to a state to separate from the magnetically-attracting surface 63 by the spring force of the flat spring 70. The movable iron core 60 presses the poppet valve 41 onto the first valve seat 24 through the valve driving member 42, against the spring force of the compression spring 46. Thus, the communication between the first port 21 and the second port 22 is blocked.

In this manner, when the coil 56 is de-energized, the poppet valve 41 is pressed onto the first valve seat 24 and causes the valve driving member 42 to be positioned at a lower limit where movements of the valve driving member 42 are regulated. In this manner, abutting portions of the driving portions 44, that is, the tip portions 44a, of the valve driving member 42 serve as a fulcrum for a tensile force applied to the movable iron core 60; the engaging protrusion 76 serves as a "point of effort" of the tensile force; and the sliding-contacting surface 61 serves as a "point of load"; whereby the flat spring 70 presses the sliding-contacting surface 61 onto the sliding-abutting surface 62. Thus, the sliding-contacting surface 61 is kept in a contacting state with the sliding-abutting surface 62 even when the coil is de-energized, so that the sliding-contacting surface 61 is prevented from being separated from the sliding-abutting surface 62. In other words, the flat spring 70 functions to apply a spring force to the movable iron core 60 in such a direction in which the magnetically-attracted surface 64 separates from the magnetically-attracting surface 63, and a function to fix the sliding-contacting surface 61 onto the sliding-abutting surface 62.

When the coil 56 is energized, a looped magnetic circuit is generated between the fixed iron core 50 and the movable iron core 60 so that the swingable end of the movable iron core 60 is attracted toward the driving leg 51, as shown in FIGS. 2 and 7. At this time, the movable iron core 60 exerts swinging movements against the spring force of the flat spring 70, while the sliding-contacting surface 61 slides on the sliding-abutting surface 62. During this swinging movement, a magnetic flux flows between the arcuate sliding-contacting surface 61 and the sliding-abutting surface 62 to generate an attraction force; thus, the movable iron core 60 is prevented from being separated from the supporting leg 52 of the fixed iron core 50. FIG. 8 shows the flow passage block 27 illustrated by two-dot chain lines in order to clearly indicate the contacting state between the valve driving member 42 and the movable iron core 60.

Upon assembling the solenoid valve 10, the poppet valve 41 and the compression spring 46 are preliminarily attached to the valve driving member 42. Next, the flow passage block 27 in which the valve driving member 42 has been assembled is inserted into the valve housing 11 from the opening end 17 so that the flow passage block 27 is attached to the flow passage portion 16 of the valve housing 11. The bobbin 54 is preliminarily attached to the fixed iron core 50, and the coil 56 is wound around the bobbin 54. The movable iron core 60, the flat spring 70 and the bobbin 54 which have been temporarily assembled by engagements are then inserted into the valve housing 11 from the opening end 17. The movable iron core 60 abuts on the tip portions 44a of the valve driving member 42.

Since a bottom surface of the first flow passage forming portion 31 in the flow passage block 27 is made in contact with the bottom portion of the valve housing 11, with the exception of the second port 22 and the valve element housing hole 26, upper and lower positions of the flow passage block 27 and the valve housing 11 are determined. Since the peripheral portion of the bottom surface of the flat spring 70 is made in contact with the upper surface of the flow passage block 27, the upper and lower positions of the flat spring 70 and the flow passage block 27 are determined. Since bottom surfaces 96 and 97 of the fitting protrusion 77 of the bobbin 54 are made in contact with a frame portion 98 of the supporting portions 71 of the flat spring 70 and a frame portion 99 of the connected portion 74, the upper and lower positions of the bobbin 54 and the flat spring 70 are determined. Since the lower surface of the yoke portion 53 of the fixed iron core 50 is made in contact with an upper surface of the abutting flange 57 of the bobbin 54, the upper and lower positions of the fixed iron core 50 and the bobbin 54 are determined. In this manner, since the valve housing 11, the flow passage block 27, the flat spring 70, the bobbin 54 and the fixed iron core 50 have abutting surfaces which are made in contact with one another, the upper and lower positions are respectively determined when these members are successively inserted into the valve housing 11. Thus, a temporarily assembled state is derived in which all parts to be inserted into the valve housing 11 are positioned and fixed.

The solenoid valve 10 has the valve housing 11 which is provided with the flow passage portion 16 on its bottom portion; the poppet valve 41 is disposed on the flow passage portion 16 of the valve housing 11, and parts such as the fixed iron core 50 and the movable iron core 60 which drive the poppet valve 41 are assembled into the solenoid valve 10. In this manner, the poppet valve 41 and members which drive the poppet valve 41 are assembled in a single valve housing 11. Therefore, when compared to a structure which has a member for storing the valve element and a housing for storing parts which drive the valve element, the present invention can reduce the number of parts and further enhance the assembly workability of the solenoid valve 10.

The flow passage portion 16 is opened toward the opening end 17 of the valve housing 11, and the housing space 18 in which members constituting the solenoid valve 10 are stored is opened in the opening end 17. Therefore, the solenoid valve 10 can be assembled by inserting all parts which constitute the solenoid valve 10, such as the movable iron core 60, from the opening end 17. The fixed iron core 50 and the coil 56 are attached to the bobbin 54. The fixed iron core 50 is engaged with and fixed to the engaging claw 75 on the flat spring 70, and the attaching claws 72 of the flat spring is respectively engaged with and fixed to the attaching claw holders 95 of the bobbin 54. In this manner, the fixed iron core 50, the coil 56, the bobbin 54, the flat spring 70 and the movable iron core 60 are temporarily assembled as one integral unit before being inserted into the valve housing 11. The movable iron core 60 is accurately positioned facing the fixed iron core 50 by the abutment between the arcuate sliding-abutting surface 62 and the sliding-contacting surface 61. Thus, the small-sized solenoid valve 10 can be easily assembled.

In a state in which the fixed iron core 50 is inserted in the valve housing 11, a liquid-state resin 84 is injected into and cured in the valve housing 11. Thus, the fixed iron core 50 and bobbin 54 are fixed in the valve housing 11. The second sealing member 82 prevents the liquid-state resin 84, which is injected when assembling the solenoid valve 10, to flow into the iron core housing chamber 59 through a gap formed between the fixed flange 58 of the bobbin 54 and the valve housing 11. The second sealing member 82 further prevents the liquid-state resin 84 to flow into the iron core housing chamber 59 through a gap formed between the supporting leg 52 and the fixed flange 58.

A state prior to the injection of the liquid-state resin 84 into the valve housing 11 corresponds to a temporarily assembled state of the solenoid valve 10. Under this temporarily assembled state, all parts to be assembled into the valve housing 11 are disposed at predetermined positions. Moreover, the gap between the fixed flange 58 and the valve housing 11 is sealed by the first sealing member 81, the gap between the fixed flange 58 and the sealing flange 78 is sealed by the second sealing member 82, and a gap between the yoke portion 53 and the abutting flange 57 is further sealed by the sealing member 83. Therefore, in a temporarily assembled state, characteristic inspections for the solenoid valve 10 can be performed by activating the solenoid valve 10, in which a driving current is applied to the coil 56 and compressed air is supplied to the first port 21. During the characteristic inspection, if a predetermined operational characteristic cannot be obtained or if an operation failure occurs, parts such as the fixed iron core 50 which is attached with the coil 56 may be removed from the valve housing 11 so as to replace the defective part. Therefore, for example, if a defect is only in the coil 56, the fixed iron core 50 can be reused, so that the manufacturing yield of the solenoid valve 10 can be increased.

The compressed air supplied from the first port 21 or the like flows into the iron core housing chamber 59 via the through holes 45 and further flows into a gap between the driving leg 51 and the bobbin 54. However, the compressed air is hermetically sealed in by the sealing member 83, and is prevented from leaking out from the valve housing 11.

A circuit board 85 is attached to the front wall 12 of the valve housing 11. In order to support the circuit board 85, a plurality of circuit board supporting claws 86 are provided on the front wall 12, and the circuit board 85 is attached to the valve housing 11 by the circuit board supporting claws 86. A conductive terminal 87 attached to the abutting flange 57 is connected to a winding wire of the coil 56, and when the circuit board 85 is attached to the front wall 12, the conductive terminal 87 is connected to a through hole provided on the circuit board 85. A power-supply terminal 88 which supplies a driving current to the coil 56 from the outside is provided on the circuit board 85.

As shown in FIGS. 1 and 2, an end cover 91 is detachably attached to the opening end 17 of the valve housing 11. A socket portion 92 to which a connector (not shown) is attached, is provided on the end cover 91. The connector to be attached to the socket portion 92 is connected to the power-supply terminal 88. A front cover 93 is attached to the front wall 12 of the valve housing 11 and is covered over the circuit board 85.

When the solenoid valve 10 is operated in the temporarily assembled state, the end cover 91 is not attached to the valve housing 11, and the fixed iron core 50 is pressed downward from the outside of the solenoid valve 10. Thus, the assembly dimensions can be controlled as designed. Moreover, the compressed air prevents the internal parts of the solenoid valve 10 from falling out of the solenoid valve 10.

In the solenoid valve 10, a side to which the circuit board 85 is attached is defined as a front side of the valve housing 11, an opposing side is defined as a rear side, and a portion where the ports 21 to 23 are formed is defined as a bottom portion of the valve housing 11. Furthermore, a portion of the valve housing 11 to which the end cover 91 is attached is defined as the opening end 17.

In a solenoid valve 10 used for pneumatic circuits which supply compressed air from a compressed air-supply source to a pneumatic cylinder serving as an equipment to be supplied with compressed air, the first port 21 serves as an air-supply port which is connected to the compressed air-supply source by an air-supplying pipe. The second port 22 serves as an output port which supplies compressed air to the pressure chamber of the pneumatic cylinder, and the third port 23 serves as an exhaust port which discharges the compressed air which had returned from the pressure chamber. Therefore, when the coil 56 is de-energized, as shown in FIG. 1, the movable iron core 60 is driven by the spring force of the flat spring 70 toward the valve driving member 42 so that the poppet valve 41 abuts on the first valve seat 24. Thus, the poppet valve 41 is set at a closed position to block communication between ports 21 and 22, and is further set at an open position to allow the ports 22 and 23 to communicate with each other. In this state, air discharged from the pressure chamber of the pneumatic cylinder is discharged outside through the third port 23.

On the other hand, when the coil 56 is energized, as shown in FIG. 2, the movable iron core 60 is attracted toward the magnetically-attracting surface 63 of the driving leg 51 against the spring force of the flat spring 70, and the magnetically-attracted surface 64 abuts on the magnetically-attracting surface 63. Thus, the poppet valve 41 is set at a closed position to block communication between the second port 22 and the third port 23, and is further set at an open position to allow the first port 21 and the second port 22 to communicate with each other. In this state, compressed air is supplied to the pressure chamber of the pneumatic cylinder from the first port 21 through the second port 22.

When the ports 21 to 23 are allowed to communicate with a block-shaped member, sealing members 94 are attached to the rear wall 13 at the bottom portion of the valve housing 11 in order to seal gaps between the block-shaped member and the ports 21 to 23.

In a solenoid valve 10 described hereinafter, the above-mentioned three-port solenoid valve is replaced with a two-port solenoid valve; the two-port solenoid valve has two ports 21 and 22, and a poppet valve 41 can be operated between an open position to supply compressed air from the port 21 to a member to be supplied with compressed air, and a closed position to block the supplying of the compressed air to the member; thus, the compressed air which is supplied to an equipment can be controlled. In this case only one flow passage forming portion 31 is provided on a flow passage block 27. In this variation, members constituting the solenoid valve 10 are inserted from an opening end 17, as is the case with the three-port solenoid valve; thus, the small-sized solenoid valve 10 can easily be assembled.

FIGS. 9 to 12 are cross-sectional views showing variations of the solenoid valve 10. In these drawings, common members shown in the above-mentioned solenoid valve 10 are indicated by the same reference numbers.

Figure 9:
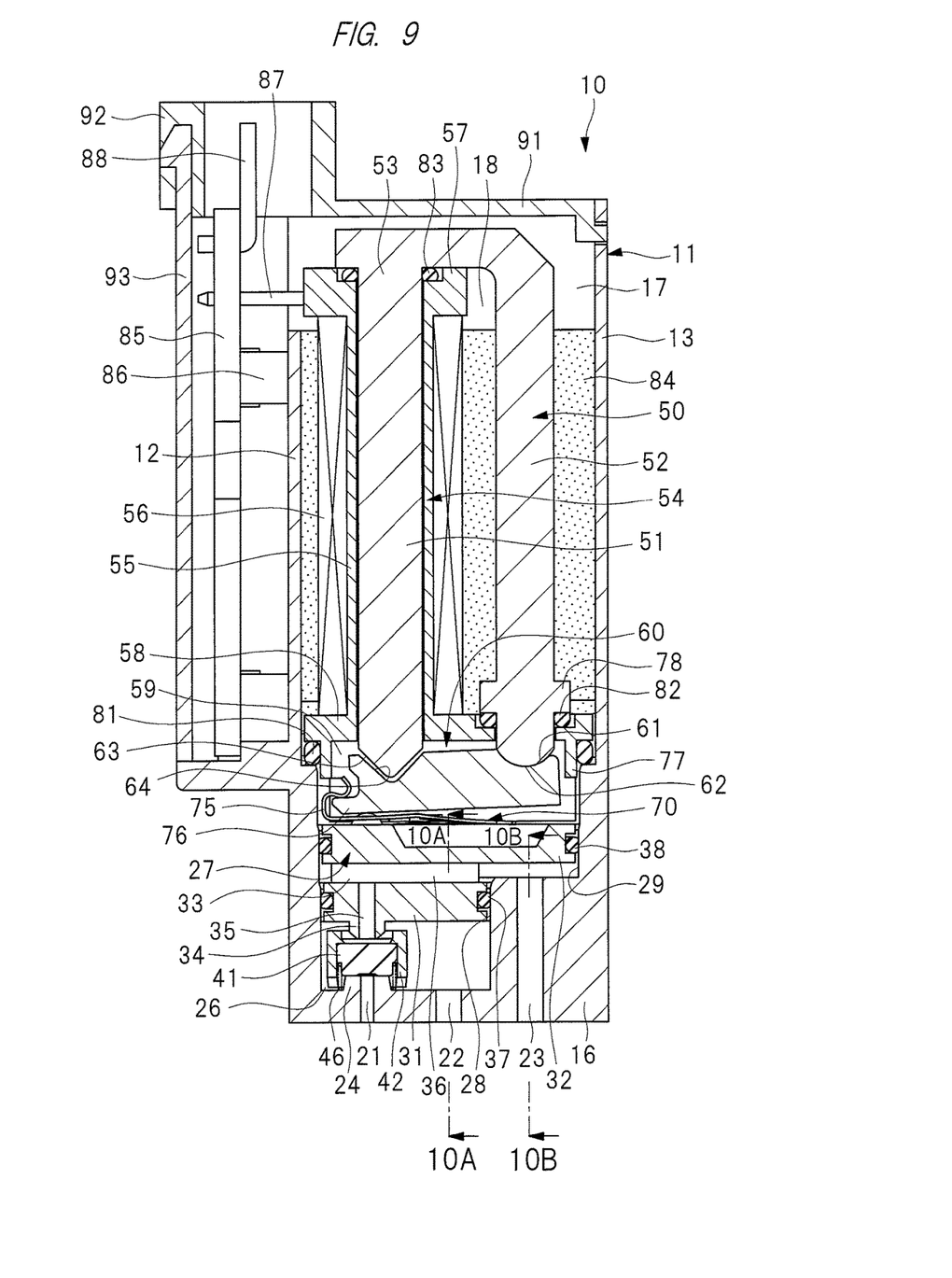
FIG. 9 is a cross-sectional view showing a variation of the solenoid valve.
Figure 10A:
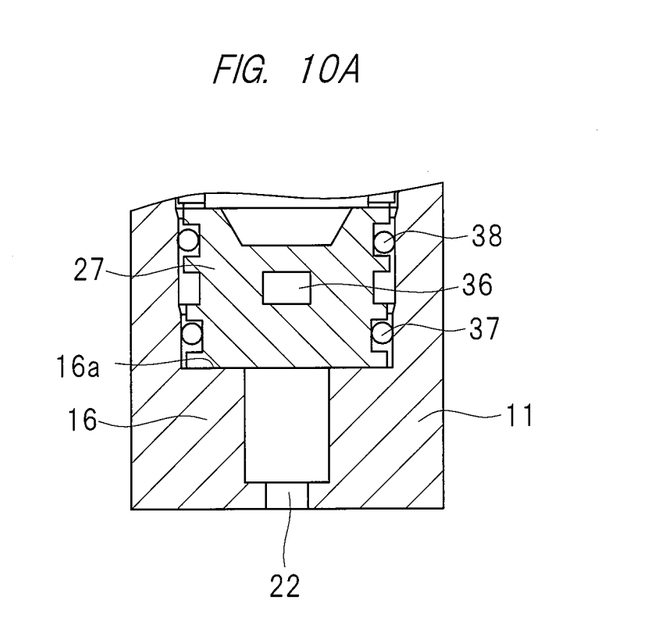
FIG. 10A is an enlarged cross-sectional view taken along a line 10A-10A of FIG. 9.
Figure 10B:
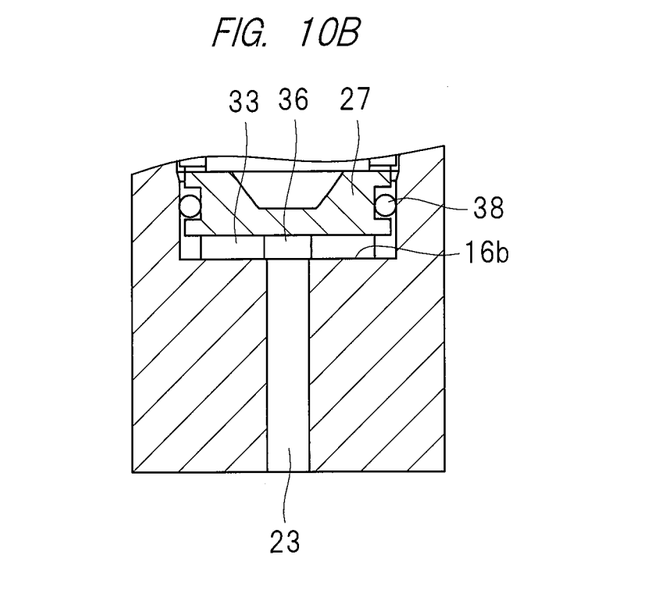
FIG. 10B is an enlarged cross-sectional view taken along a line 10B-10B of FIG. 9.

In the solenoid valve 10 shown in FIGS. 9 and 10, each of the first to third ports 21 to 23 extend in the longitudinal direction of a valve housing 11, and are opened on a bottom surface of the valve housing 11. In this type of solenoid valve 10, a first port 21 is provided on a valve seat 24 and opened on a bottom surface of a valve element housing hole 26, and the second port 22 is also opened on the bottom surface of the valve element housing hole 26. A configuration for the ports 21 to 23 as shown in FIGS. 1 and 2 is known as a "rear-ported type", and FIG. 9 shows a "bottom-ported type" configuration.

Figure 11:
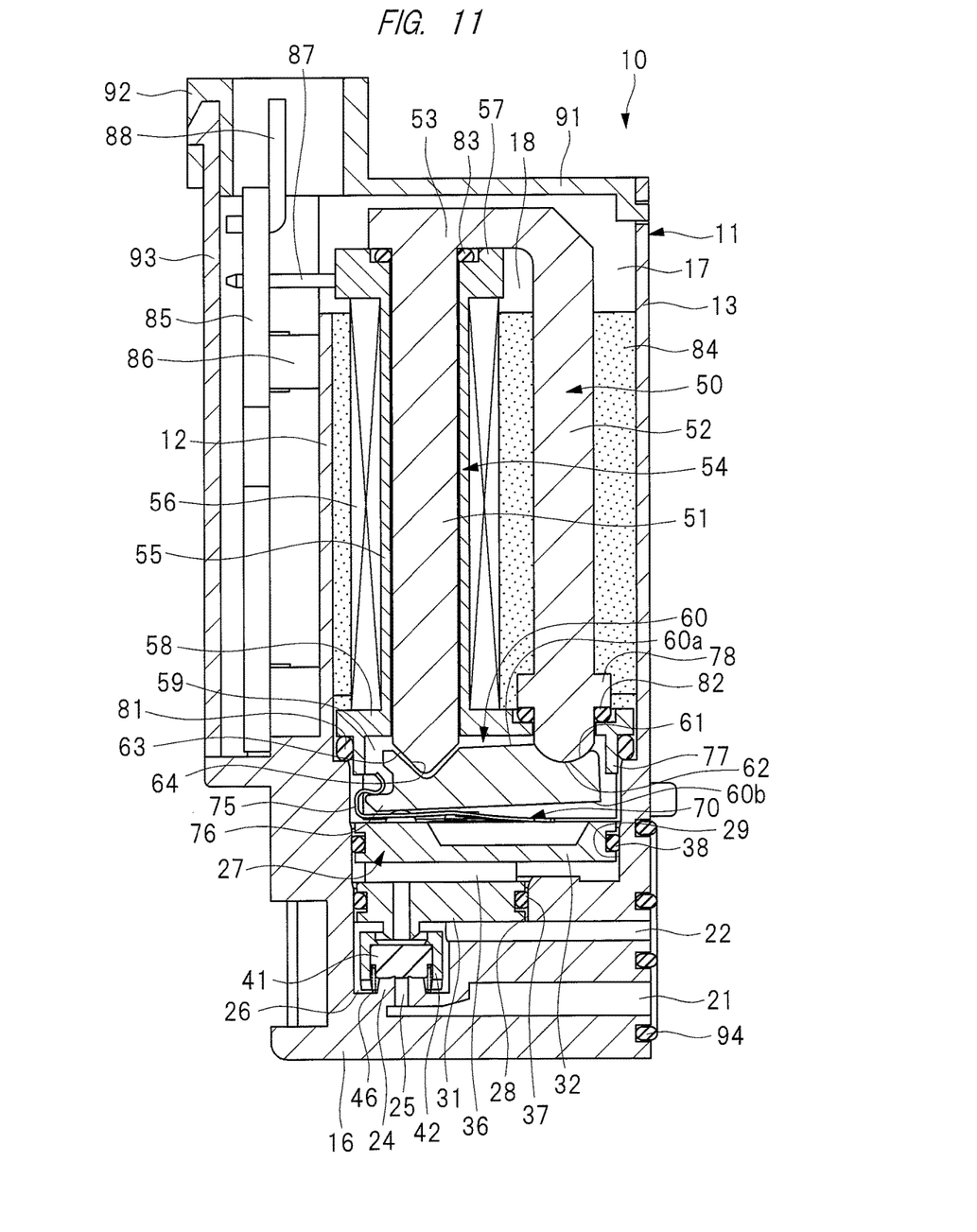
FIG. 11 is a cross-sectional view showing another variation of the solenoid valve.

In the solenoid valve 10 shown in FIG. 11, a first port 21 and a second port 22 are provided on a flow passage portion 16; however, the third port 23 as shown in FIGS. 1 and 2 is not provided. Therefore, the solenoid valve is a two-port solenoid valve, and when a coil 56 has no driving current applied and is de-energized, a poppet valve 41 abuts on a valve seat 24, as shown in FIG. 11, so that communication between the first port 21 and the second port 22 is blocked. On the other hand, when the coil 56 is energized, the poppet valve 41 separates from the valve seat 24 so that the first port 21 and the second port 22 are allowed to communicate with each other.

Figure 12:
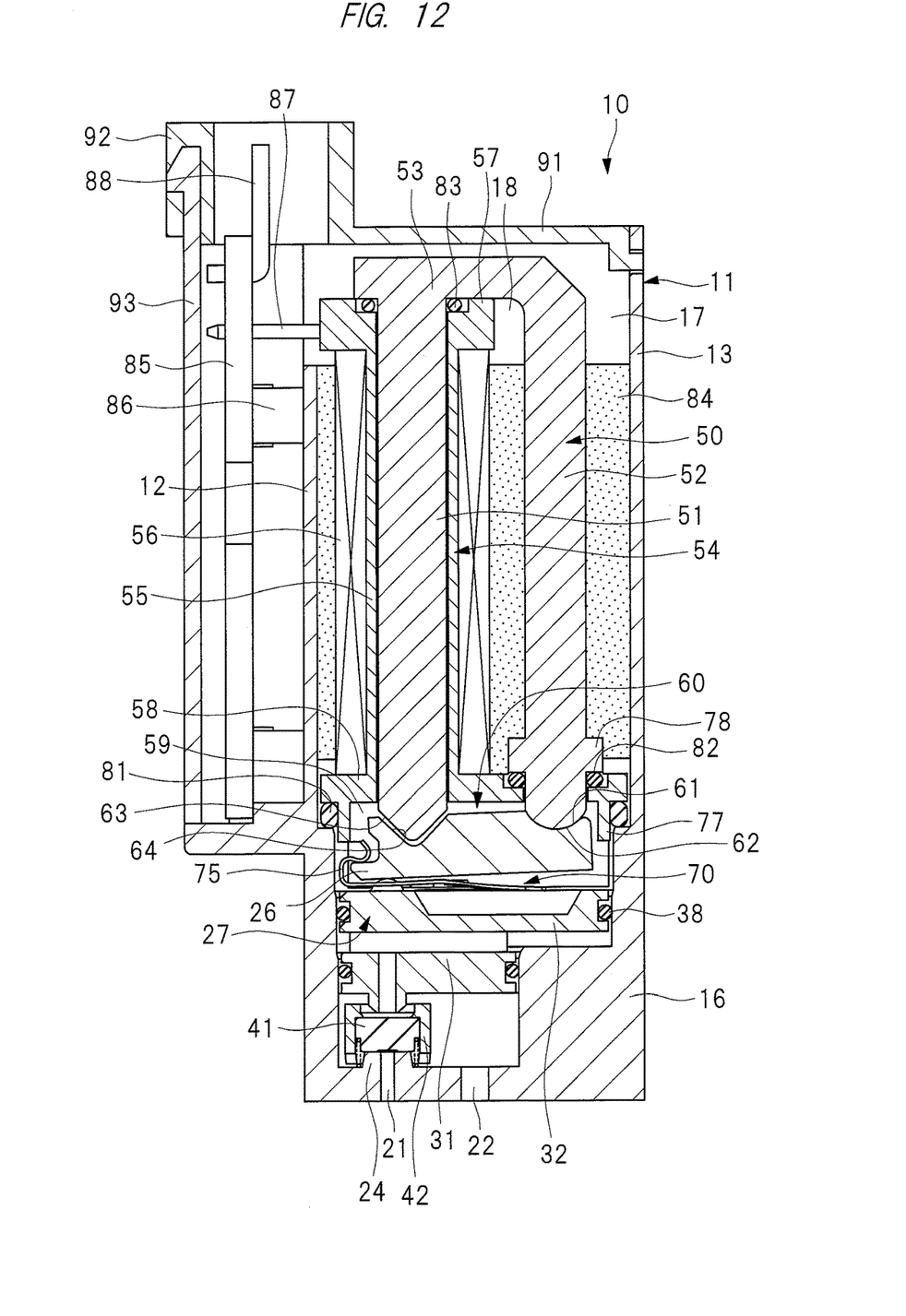
FIG. 12 is a cross-sectional view showing yet another variation of the solenoid valve.

The solenoid valve 10 shown in FIG. 12 is a two-port solenoid valve in the same manner as that of FIG. 11, and a first port 21 and a second port 22 each extend in a longitudinal direction of a valve housing 11, the first port 21 and the second port 22 being provided on a bottom surface of the valve housing 11. Therefore, the configuration for ports 21 and 22 is "bottom-ported".

The present invention is not limited to the above-mentioned embodiment, and is able to be variously modified in the range not departing from the substance.

The solenoid valve is applied to pneumatic circuits which supplies compressed air to pneumatically operated equipment from a compressed air-supply source.

Although various embodiments of the present invention have been described and shown, the invention is not restricted thereto, but may also be embodied in other ways within the scope of the subject-matter defined in the following claims.

What is claimed is:

1. A flat spring for a solenoid valve having a movable iron core and a fixed iron core, the fixed iron core having a coil wound around a bobbin, the flat spring being configured to apply a spring force to the movable iron core in a direction to separate a magnetically-attracted surface of the movable iron core from a magnetically-attracting surface of the fixed iron core, the flat spring comprising:
    an engaging claw for engagement with an engaging protrusion provided on the movable iron core, the movable iron core being attached to the flat spring by the engagement between the engaging protrusion and the engaging claw;
    a supporting portion which is integrally connected with the engaging claw and provided for installation of the flat spring in a position fixed between a valve housing of the solenoid valve and the bobbin; and
    a pair of attaching claws for engagement with respective attaching claw holders provided on the bobbin, the attaching claws being fixed to the respective attaching claw holders by engagement between the attaching claws and the attaching claw holders.

2. The flat spring for the solenoid valve according to claim 1, further comprising:
    a pulling portion provided with the engaging claw on a leading end portion of the pulling portion; and
    a connected portion which connects a base end portion of the pulling portion with the supporting portion.

3. A solenoid valve comprising:
    a valve housing having a valve element which is operated between a closed position in which the valve element abuts on a valve seat to close communication holes and an open position in which the valve element separates from the valve seat to open the communication holes;
    a fixed iron core provided in the valve housing;
    a magnetically-attracting surface provided on the fixed iron core;
    a coil wound around a bobbin, the coil and bobbin being operatively associated with the fixed iron core, the bobbin having attaching claw holders;
    a movable iron core having an engaging protrusion provided in the valve housing, a magnetically-attracted surface also being provided on the movable iron core and being attracted onto the magnetically-attracting surface of the fixed iron core; and
    a flat spring configured to apply a spring force to the movable iron core in a direction to separate the magnetically-attracted surface of the movable iron core from the magnetically-attracting surface of the fixed iron core, the flat spring comprising:
        an engaging claw for engagement with the engaging protrusion on the movable iron core, the movable iron core being attached to the flat spring by the engagement between the engaging protrusion and the engaging claw;
        a supporting portion which is integrally connected with the engaging claw and provided for installation of the flat spring in a position fixed between a valve housing of the solenoid valve and the bobbin, and
        a pair of attaching claws for engagement with the attaching claw holders provided on the bobbin, the attaching claws being fixed to the respective attaching claw holders by engagement between the attaching claws and the attaching claw holders.

* * * * *